United States Patent [19]

Mock et al.

[11] Patent Number: 4,549,046
[45] Date of Patent: Oct. 22, 1985

[54] TELEPHONE ANSWERING SYSTEM WITH REMOTE CONTROL CAPABILITIES

[75] Inventors: Gerald L. Mock, Corona; Bradford E. Hanscom, Downey, both of Calif.

[73] Assignee: T.A.D. Avanti, Inc., Compton, Calif.

[21] Appl. No.: 523,115

[22] Filed: Aug. 15, 1983

[51] Int. Cl.$^4$ .............................................. H04M 1/64
[52] U.S. Cl. ................................................... 179/6.11
[58] Field of Search ............... 179/6.01, 6.03, 6.10, 179/6.11, 6.07, 6.09

[56] References Cited

U.S. PATENT DOCUMENTS

| | | | |
|---|---|---|---|
| 3,991,274 | 11/1976 | Darwood | 179/6.11 |
| 4,328,397 | 5/1982 | Chamberlin | 179/6.09 |
| 4,400,586 | 8/1983 | Hanscom | 179/6.11 |
| 4,469,919 | 9/1984 | Nakamura et al. | 179/6.07 |

Primary Examiner—Donald McElheny, Jr.
Attorney, Agent, or Firm—Keith D. Beecher

[57] ABSTRACT

A telephone answering system with remote control capabilities which responds to a control signal received over the telephone line during an announcement interval ($T_1$) or during a message recording interval ($T_2$) to play back messages over the telephone line to the calling party. The system is susceptible to a number of controlled operations such as the playback of all previously recorded messages, playback of new messages only, remote changing of the announcement, remote backspacing control, selective erasure of the messages after playback, providing an indication to the calling party as to whether any new messages have been recorded since his last remote operation, and other controlled operations to be described.

11 Claims, 1 Drawing Figure

TELEPHONE ANSWERING SYSTEM WITH REMOTE CONTROL CAPABILITIES

BACKGROUND OF THE INVENTION

The system of the invention is of the same general type as described in Darwood U.S. Pat. No. 3,991,274 which issued Nov. 9, 1976 and which is assigned to the present assignee. The telephone answering system described in the Darwood patent is one which includes a first magnetic tape (T-1) on which an announcement is recorded, and which is activated during an announcement interval ($T_1$) in response to a telephone call, and which causes the recorded announcement on the announcement tape to be transmitted over the telephone line to the calling party during that interval. At the end of the announcement interval ($T_1$) a message tape (T-2) is activated, and the message received over the telephone line from the calling party during the ensuing time interval ($T_2$) is recorded.

The remote control of the telephone answering system described in the Darwood patent, and of the telephone answering system of the present invention, may be achieved by means of a small portable transmitter unit which is held up by the calling party to the mouthpiece of a telephone, and which is pushbutton controlled to transmit a remote control tone signal over the telephone line. The telephone answering systems of the Darwood patent and of the present invention are designed to respond to the particular tone frequency of the control signal to activate a remote control circuit, so that the message tape may be rewound and then set to a playback condition so that the messages on the tape may be successively transmitted over the telephone line to the calling party.

In the telephone answering system described in the Darwood patent, the T-1 announcement tape is an endless tape on which the announcement is recorded, and which makes a complete revolution during the announcement interval ($T_1$); and the T-2 message tape is in the form, for example, of a tape cassette, which is moved in the forward direction during each message recording interval ($T_2$), and which is rewound and then again moved in the forward direction during playback. In the embodiment of the present invention to be described, the announcement tape is a cassette similar to the message tape, and it is rewound at the end of the message interval ($T_2$).

In the system of the present invention the remote control tone signal can be sent to the telephone answering system by the calling party over the telephone line at any time during the ($T_1$) or ($T_2$) intervals, whereas in the system described in the Darwood patent, the remote control signal had to be sent during the announcement interval ($T_1$). In the system of the present invention, when the remote control signal is received by the system it is fed to a microcomputer which is utilized in the system to control its operation. If the remote control signal is sent during the announcement interval ($T_1$), the microcomputer causes the T-1 announcement tape to stop, and then causes the T-2 message tape to rewind a controlled amount so that messages recorded on the message tape may be played back over the telephone line. If the remote control signal is sent during the message recording interval ($T_2$), after the announcement tape has stopped, the message tape is stopped, and it is rewound a controlled amount so that messages recorded on the tape may be played back to the calling party over the telephone line.

In either case, when the remote control signal is transmitted to the telephone answering system, either during the announcement interval ($T_1$) or during the message recording interval ($T_2$) the microcomputer causes the system to transmit a series of beep tones to the calling party over the telephone line. If the calling party again sends the remote control signal to the telephone answering system during the series of beep tones, a new announcement may be recorded on the T-1 announcement tape. On the receipt of the remote control signal during that interval, the announcement tape is wound to its beginning position, at which time the microcomputer causes a continuous tone to be transmitted to the calling party over the telephone line indicating that the system is now ready to receive the new announcement. The calling party then transmits the new announcement over the telephone line, and it is recorded on the T-1 announcement tape. The calling party then transmits the remote control signal once more, which causes the microcomputer to stop the announcement tape, and to cause a beep tone to be recorded on the announcement tape, indicating the end of the announcement.

The microcomputer then automatically causes the T-1 announcement tape to be rewound to its beginning position, and then to play back the new announcement to the calling party over the telephone line for monitoring purposes. When the recorded beep tone is reached, the microcomputer causes the system to switch over to the normal message recording interval ($T_2$). At that time, if the calling party is satisfied with the new announcement, he merely hangs up, and the system will be returned by the microcomputer to its usual standby condition. If the calling party is not satisfied with the new announcement, at that time, he can repeat the steps described above, and record a new announcement.

However, if after the remote control signal has been sent to the telephone answering system for the first time during the announcement interval ($T_1$) or during the message recording interval ($T_2$), and if the remote control signal is not sent to the system during the interval of the series of beeps, the microcomputer will cause a four-second tone signal to be transmitted to the calling party if there are no new messages recorded on the T-2 message tape since his last remote operation, and the calling party can then hang up, enabling the microcomputer to return the system to its normal standby condition.

However, if there are new messages recorded on the message tape, the microcomputer will not cause the four-second tone signal to be transmitted to the calling party, and will cause the message tape (T-2) to rewind to a position corresponding to the beginning of the new messages, and at that time will cause the message tape to play back the new messages over the telephone line to the calling party. The microcomputer will cause a beep tone to be transmitted to the calling party every 3 seconds as long as the message tape (T-2) is being rewound.

At any time during the playback period, the calling party may transmit the remote control signal over the telephone line, and upon the receipt of the remote control signal the microcomputer will cause the message tape (T-2) to backspace for as long as the calling party continues the remote control signal. This permits the calling party to cause the machine to transmit to him any of the previously recorded messages.

After the last of the new messages has been played back over the telephone line to the calling party, the microcomputer will cause a four-second tone to be transmitted over the telephone line to the calling party. The calling party may hang up during that tone, in which event the telephone answering system will revert to the announcement interval ($T_1$), and the T-1 announcement tape will be rewound to its beginning position. The T-2 message tape will remain at its last position, and the messages recorded on the message tape will be saved.

If, on the other hand, the calling party does not hang up during the four-second tone, the microcomputer will then cause a series of beep tones to be sent to the calling party over the telephone line. If the calling party transmits the remote control signal during the beep tones, the T-2 message tape will be caused to rewind to the beginning of the new messages recorded on that tape, and the new messages will be erased. At the same time, the T-1 announcement tape will be caused to rewind to its beginning position.

During any remote operation, the calling party may record a flag message on the message tape by waiting for the beep at the end of the announcement on the announcement tape, and by then dictating the flag message over the telephone line. The remote operation may then be initiated by the transmission of the remote control tone signal after the flag message has been recorded.

It should be noted that the microcomputer continually keeps track of the position of the T-2 message tape, so that there is no need for the calling party to send the remote control signal to the system after the last message has been read back to him in order to stop the message tape, since the tape is automatically stopped under the control of the micro-computer.

Should the calling party hang up at any time during the playback operation, the T-2 tape will be automatically advanced to the end of the new messages.

DETAILED DESCRIPTION OF THE ILLUSTRATED EMBODIMENT

Figure 1:
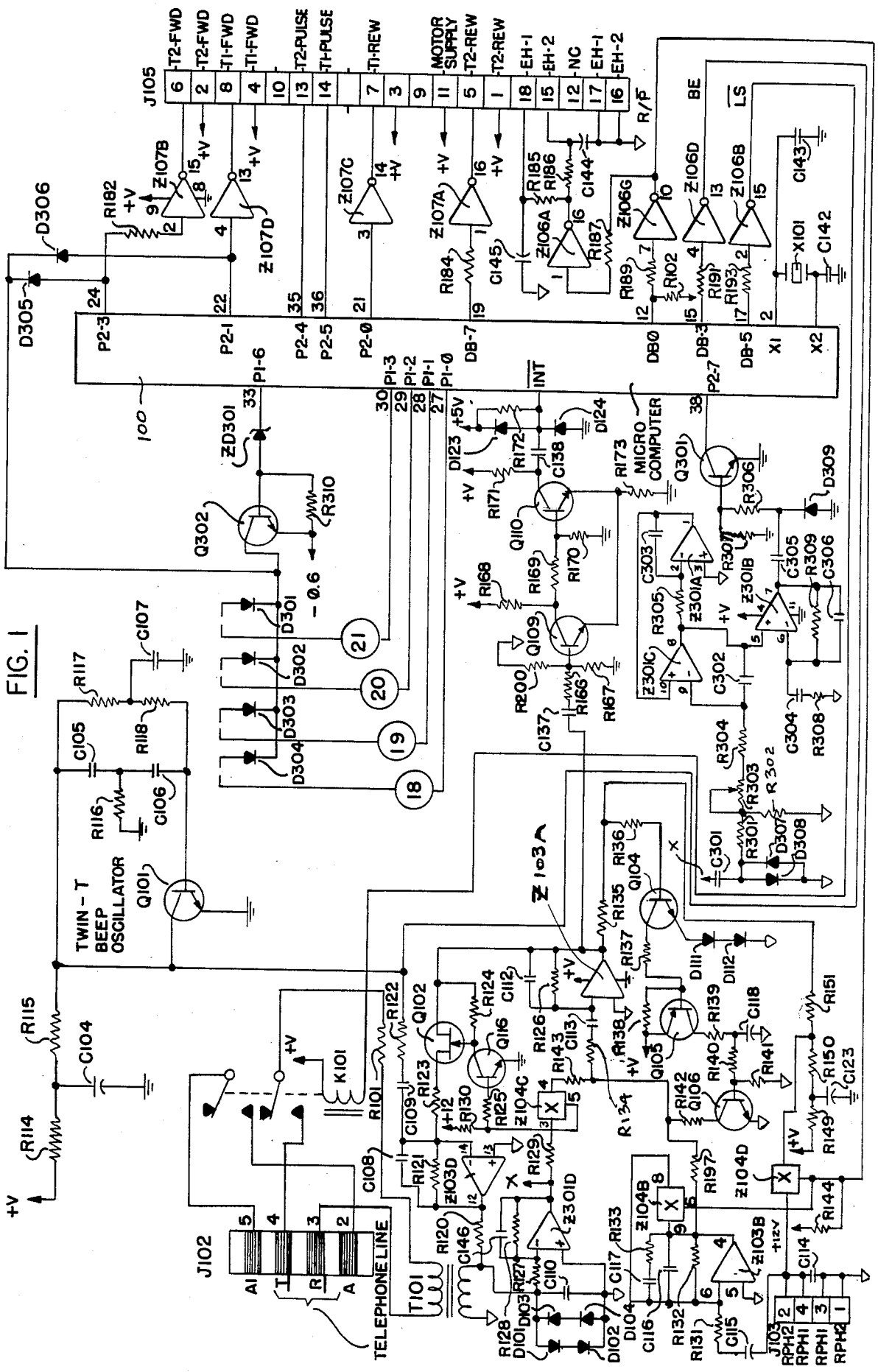
FIG. 1 is a schematic circuit diagram of a telephone answering system incorporating the concepts of the present invention.

The system shown in FIG. 1 includes a microcomputer 100 which may be of the type manufactured and sold by National Semiconductor Company, and designated by them as INS8049. The system includes a terminal strip J102 which has terminals 3 and 4 connected to the tip and ring terminals of the telephone line. Line seizure is effectuated by a relay K101. The system is coupled to the telephone line through a transformer T101. The outgoing audio is amplified by an amplifier Z103D, and the incoming audio is amplified by an amplifier Z301D. A terminal board J103 is connected to the record and reproduce head RPH2 associated with the T-2 message tape and to the record and reproduce head RPH1 associated with the T-1 announcement tape. The system also includes a twin-T beep oscillator circuit associated with transistor Q101.

The remote control tone signal which is also passed by amplifier Z301D is introduced to a narrow bandpass filter including amplifiers Z301C, Z301A and Z301B, and is passed through transistor Q301 to the terminals P2-7 of the microcomputer 100.

The incoming audio from transformer T101, as amplified by amplifier Z301D is passed through a bilateral analog switch Z104C to a further amplifier Z103A, and through a bilateral analog switch Z104D to the record/reproduce head RPH2 to be recorded on the message tape (T-2), and to record/reproduce head RPH1 to be recorded on announcement tape (T-1). Resistors R149 and R150, together with grounded capacitor C123 provide a bias circuit for the head. An automatic gain control circuit for amplifier Z103A is provided by transistors Q104, Q105 and Q106.

When the remote control signal is received during the $T_2$ time interval, it is fed to Z301D by way of resistor R127 and transformer T101. Z301D feeds the signal to bilateral analog switch Z104C, and from there to the audio system of amplifier Z103A. The remote tone signal is also fed to the narrow bandpass filter consisting of Z301C, Z301A and Z301B. The frequency of the bandpass filter is adjusted by potentiometer R303. The output of Z301B is fed to port P2-7 of the microcomputer by way of capacitor C305, resistor R306 and transistor Q301.

Once the remote control signal is sampled and its frequency is determined by the microcomputer 100, it is compared to the diode matrix code created by the removal or insertion of diodes D301 through D304. If its frequency matches the code, the microcomputer will cause Q102 to turn on and switch Z104C to turn off placing the system in the transmit mode. If the remote signal does not remain on for at least 1 second, the microcomputer will switch the system back to the receive mode by setting port DB4 high (1), turning Q102 off and switch Z104C on.

If the remote control signal is present for 1½ seconds or longer, the microcomputer 100 will set port DB-3 alternately high (1) and low (0), turning the twin-T beep oscillator of transistor Q101 on and off. This causes a series of beep tones to be transmitted over the telephone line. When port DB-3 goes high and low, it causes the output of inverter Z106D to go high and low which operates the beep oscillator. Specifically, Z106D causes transistor Q101 to go conductive and non-conductive and thereby causes the beep oscillator to turn on each time the output of Z106D goes high and to turn off each time the output of Z106D goes low (0). This produces a series of beeps which are transmitted over the telephone line.

When a T-1 remote operation is to be carried out, the remote control signal is fed into the system through transformer T101 and amplifier Z301D to the narrow bandpass filter Z301C, Z301A and Z301B, and through transistor Q301 to terminal P2-7 of the microcomputer, it will signal the microcomputer to enter the T-1 record mode. The microcomputer will then activate the T-1 rewind solenoid by making terminal P2-0 high (1). This will rewind the T-1 tape until the (T-1) tape pulses stop at P2-5. The microcomputer 100 will then activate port DB-3 low (0) causing the oscillator of transistor Q101 to give a steady beep tone. This tone will continue for approximately 1 second. Once the beep tone sounds, and T-1 rewind stops, port P2-0 is made low (0) and port P2-1 is made high (1), activating the forward control of tape (T-1).

To assure that the microcomputer will respond only to the remote control signal received from the calling party and not to beep signals recorded on the tapes, or generated in the system, the microcomputer will recognize the remote control signal at port P2-7 only if no beep tone is recognized at port $\overline{INT}$.

Port DB-0 at this time will be made low (0), causing the output of inverter Z106G to be high (1), activating the T-1 erase head (EH1) by way of resistor R187, inverter Z106A and resistor R185. The output of inverter Z106G also causes switch Z104D to switch on, connecting the bias circuit R149, R150 and C123, and the level setting resistor R151, to the record/reproduce head RPH1 to provide an audio pass to the head. The incoming audio signal from the telephone line is then fed through transformer T101, amplifier Z301D, switch Z104C to amplifier Z103A. The output from Z103A is fed to resistor R136 so that the AGC circuit of transistors Q104, Q105 and Q106 are able to keep a constant record level. The output from Z103A is fed by way of level setting resistor R151 to the bias circuit R150, R149 and C123, and through switch Z104D to the T-1 record head (RPH1). This enables a new announcement to be recorded on the T-1 tape.

When the remote signal is again transmitted over the telephone line, transformer T101 will feed the remote signal to amplifier Z301D and from there to the narrow bandpass filter of amplifiers Z301C, Z301B and Z301A, where it is again inputed into terminal P2-7 of microcomputer 100 through transistor Q301. When the microcomputer recognizes the remote signal, it again turns off port DB-3 and allows a 2 second beep tone to be recorded on the T-1 tape and to be transmitted over the telephone line. At the termination of the beep tone, port DB-0 is made high (1), causing switch Z104D to switch off. Port P2-1 is made low (0), causing the T-1 forward solenoid to drop out and allowing the T-1 head plate to pull back in, stopping the T-1 tape. Port P2-0 is then made high, energizing the T-1 rewind solenoid and activating the rewind mechanism for the T-1 tape, thereby causing the announcement tape (T-1) to rewind.

When the T-1 announcement tape reaches its beginning position, it automatically reverses, and begins to play back by causing port P2-1 to go high (1) again. This brings in the T-1 forward solenoid, which operates the T-1 head plate, activating the T-1 tape in the forward direction. The T-1 tape will start moving in the forward direction and play back the announcement. The output from the T-1 record/reproduce head (RPH1) is fed to amplifier Z103B by way of resistor R131 and capacitor C115, where it is pre-amplified and fed into Z103A by way of resistors R197 and R134, and capacitor C113. The resulting output from Z103A is fed through transistor Q102 to amplifier Z103D, and is then transmitted back to the calling party over the telephone line.

The T-1 announcement tape will continue to play back until microcomputer 100 recognizes the beep that was placed on the tape at the end of the announcement. When the beep tone is recognized at the $\overline{INT}$ port of the microcomputer, the microcomputer stops the T-1 operation and activates a $T_2$ cycle. For this purpose port P2-1 is made low and the T-1 forward solenoid drops out allowing the T-1 head plate to retract stopping the forward movement of the T-1 tape. At the same time, terminal P2-3 of the microcomputer is made high (1) activating the T-2 forward solenoid to cause the T-2 message tape to move forward. The T-2 tape can now record any audio that may be received at transformer T101 from the telephone line, such as the flag message described above.

When a T-2 remote operation is to be carried out, the remote signal is fed through the telephone line to transformer T101, and through amplifier Z301D to the bandpass filter Z301C, Z301A and Z301B, and from there through transistor Q301 to the microcomputer port P2-7. This signal is then analyzed by the program as frequency and duration, as described above, and if it is determined to be of the same frequency as the diode code (D301-D304), port DB-3 will successively be caused to go high and low, causing rapid beep tones to be transmitted over the telephone line, in the manner described above.

If at that time there are no new messages on the T-2 tape, and if no remote signal is received at port P2-7 through the bandpass filter during this period of rapid beeps, microcomputer 100 will cause port DB-3 to go low, so that a four-second tone may be transmitted over the telephone line informing the user that there are no messages on the message tape (T-2). The user now has the option of hanging up or backspacing the message tape.

If there are new messages on the T-2 tape, and if no remote tone is received during the rapid series of beeps described in the preceding paragraph, the microcomputer will activte port DB-7 high (1) causing the T-2 rewind solenoid to be energized to activate the rewind mechanism and rewind the T-2 tape back, either to its beginning position, or to a position that is stored in the microcomputer memory as the point at which the system was last remoted. When the T-2 tape is rewound, port P2-3 is set high (1) to activate the T-2 forward solenoid and start the T-2 tape moving in its forward direction. Audio information is now fed from the T-2 record/reproduce head (RPH2) through J103 to preamplifier Z103B, and then to Z103A by way of resistor R197, resistor R134 and capacitor C113. Amplifier Z103A feeds the audio information from the T-2 tape to the phone line by way of transistor Q102, R123, switch Z103D, R120 and T101. The messages recorded on the T-2 tape are then transmitted to the calling party over the telephone line.

Should the calling party desire a repeat of any of the messages being played back to him, he transmits another remote signal over the telephone line which passes through T101 to amplifier Z301D, and then through the bandpass filter associated with Z301A, Z301B, Z301C, and through transistor Q301 into port P2-7. When the remote signal has been identified, port P2-3 will go low (0), de-energizing the T2 forward solenoid to stop forward motion of the T-2 tape. Port DB-7 will now go high (1) activating the T-2 rewind solenoid and the T-2 rewinding mechanism will start rewinding the T-2 tape. The T-2 tape will continue to rewind so long as the remote signal exists at port P2-7. When the remote signal at port P2-7 ceases, port DB-7 will go low (0) causing the T-2 rewind solenoid to drop out. At the same time port P2-3 will go high (1) activating the T-2 forward solenoid. The T-2 forward solenoid will again activate the T-2 tape in the forward direction, resuming the transmission of the recorded messages from the T-2 tape to the telephone line.

After all of the messages recorded on the T-2 tape have been transmitted over the telephone line to the caller, the T-2 tape will stop. This is achieved by feeding pulses into port P2-4 from a T-2 pulse switch. The microcomputer counts these pulses and stores them in memory. When the pulses fed from J105-13 into port P2-4 match the number that are set in memory, the programming of the microcomputer determines that this signifies the end of all the messages recorded on the T-2 tape and will stop the tape. A long beep tone is then generated by activating port DB-3 low (0), which turns on the Q101 oscillator and causing the resulting beep tone to be fed to the telephone line. During the long beep tone the calling party can backspace the message tape (T-2) by transmitting the remote control signal.

At the termination of the continuous beep tone, port DB-3 is caused to go successively high and low, so that the Q101 beep oscillator will provide a series of beep tones to be transmitted to the calling party over the telephone line.

If all of the messages on the T-2 tape are to be saved, no remote signal is sent over the telephone line by the calling party. The microcomputer will then rewind the T1 announcement tape by causing port P2-0 to go high (1) which turns on the T-1 rewind solenoid. The T-1 announcement tape rewinds until the T-1 pulses stop at port P2-5 signifying the beginning of the T1 announcement tape. When the T1 tape reaches its beginning, the system is again ready to answer any calls received over the telephone line.

If the messages on the T-2 tape are not to be saved, the calling party again transmits the remote signal during the period in which the beep signals are transmitted to him, and this signal is fed to port P2-7 and identified. Upon identification of the remote signal, the microcomputer activates port DB-0 low (0) allowing the output of Z106A to go high (1) which turns on the T-2 erase head (EH2). Port DB-7 goes high (1) activating the T-2 rewind solenoid. The T-2 tape now rewinds back either to its beginning position, or to the position of the last remote operation, and during rewind, the messages on the T-2 tape are erased because the T-2 erase head (EH2) is activated.

When the T-2 message reaches its beginning position, or the position of the last remote operation, the microcomputer will set port DB-0 high (1), deactivating the erase head EH2; and will cause port DB-7 to go low (0), stopping the T2 rewind The T-1 announcement tape will then be rewound to its beginning position by the computer causing port P2-0 to go high (1), which activates the T-1 rewind mechanism and rewinds the T1 tape back to its beginning position. The system is now ready to receive another call over the telephone line.

The various components shown in FIG. 1 may have the following values:

R101: 150 ohms
R102: 3 kilo-ohms
R114: 1 kilo-ohm
R115: 10 kilo-ohms
R116: 9.1 kilo-ohms
R117: 39 kilo-ohms
R118: 39 kilo-ohms
R120: 620 ohms
R121: 22 kilo-ohms
R122: 62 kilo-ohms
R123: 24 kilo-ohms
R124: 1 megohm
R125: 47 kilo-ohms
R126: 1 megohm
R127: 33 kilo-ohms
R128: 47 kilo-ohms
R129: 5.6 kilo-ohms
R130: 10 kilo-ohms
R131: 47 kilo-ohms
R132: 1 megohm
R133: 300 kilo-ohms
R134: 3.9 kilo-ohms
R135: 100 ohms
R136: 4.7 kilo-ohms
R137: 10 kilo-ohms
R138: 47 kilo-ohms
R139: 1 kilo-ohm
R140: 22 kilo-ohms
R141: 22 kilo-ohms
R142: 100 ohms
R143: 5.6 kilo-ohms
R144: 4.7 kilo-ohms
R149: 4.7 kilo-ohms
R150: 16 kilo-ohms
R151: 3.9 kilo-ohms
R166: 10 kilo-ohms
R167: 33 kilo-ohms
R168: 18 kilo-ohms
R169: 12 kilo-ohms
R170: 4.7 kilo-ohms
R171: 10 kilo-ohms
R172: 330 kilo-ohms
R173: 390 ohms
R182: 3 kilo-ohms
R184: 3 kilo-ohms
R185: 200 ohms
R186: 200 ohms
R187: 47 kilo-ohms
R189: 3 kilo-ohms
R191: 3 kilo-ohms
R193: 3 kilo-ohms
R197: 5.6 kilo-ohms
R200: 150 kilo-ohms
R301: 110 kilo-ohms
R302: 100 ohms
R303: 10 kilo-ohms
R304: 3 kilo-ohms
R305: 2.7 megohms
R306: 1 kilo-ohm
R307: 10 kilo-ohms
R308: 10 kilo-ohms
R309: 100 kilo-ohms
R310: 22 kilo-ohms
C105: 2200 picofarads
C106: 2200 picofarads
C107: 0.01 microfarad
C108: 1800 picofarads
C109: 0.01 microfarads
C112: 47 picofarads
C113: 0.1 microfarads
C114: 1000 picofarads
C115: 1 microfarad
C116: 220 picofarads
C117: 2200 picofarads
C118: 47 microfarads
C123: 10 microfarads
C137: 0.1 microfarads
C138: 100 picofarads
C142: 33 picofarads
C143: 33 picofarads
C145: 100 microfarads
C146: 1000 picofarads
C301: 0.0047 microfarads
C302: 470 picofarads
C304: 0.1 microfarads
C305: 0.1 microfarads
C306: 1000 picofarads The foregoing values are listed merely by way of example, and are not intended to limit the invention in any way.

The invention provides, a telephone answering system with improved remote control capabilities by which the system is able to respond to remote control signals received either during the announcement interval ($T_1$) or during the message recording interval ($T_2$), and which is susceptible to a variety of controls by the remote control signal.

It should be appreciated that while a particular embodiment of the system of the invention has been illustrated and described, modifications may be made. It is intended in the claims to cover all such modifications which come within the true spirit and scope of the invention.

What is claimed is:

1. In a telephone answering system which responds to telephone messages received over a telephone line and which includes a first magnetic tape mechanism (T-1) having a recorded announcement thereon to be transmitted over the telephone line to a caller during a time interval ($T_1$) in response to a telephone call, and a second magnetic tape mechanism (T-2) for recording messages received over the telephone line during a second time interval ($T_2$) following the time interval ($T_1$), and which responds to a remote control signal received over the telephone line from a caller during the $T_1$ or $T_2$ time intervals to effectuate predetermined control operations; the combination of: a microcomputer; circuit means adapted to be coupled to the telephone line for receiving the remote control signal transmitted over the telephone line and for introducing the remote tone to the microcomputer; a beep oscillator circuit connected to the microcomputer to be turned on and off by the microcomputer and being coupled to the telephone line for transmitting beep tone signals over the telephone line and connected to the first magnetic tape mechanism (T-1) for recording said beep tone signals on the T-1 tape mechanism; an input circuit adapted to be coupled to the telephone line for receiving audio signals therefrom; an output circuit for coupling the system to the telephone line for transmitting audio signals to the telephone line; a first circuit connecting the microcomputer to the T-2 tape mechanism to cause the T-2 tape mechanism to move in a forward direction; a second circuit connecting the microcomputer to the T-2 tape mechanism to cause the T-2 tape mechanism to move in a reverse direction; a third circuit connecting the microcomputer to the T-1 tape mechanism to cause the T-1 tape mechanism to move in a forward direction; a fourth circuit connecting the microcomputer to the T-1 tape mechanism to cause the T-1 tape mechanism to move in a reverse direction; said microcomputer responding to the remote control signal received from a caller over the telephone line during the $T_2$ interval to cause said beep oscillator to transmit at least one beep tone signal over the telephone line to the caller; and said microcomputer responding to the remote tone signal from a caller received over the telephone line during the $T_1$ interval to cause the third circuit to stop the forward motion of the T-1 tape, and to cause the beep oscillator to transmit at least one beep tone over the telephone line to the caller.

2. The combination defined in claim 1, in which the microcomputer responds to a remote control signal received over the telephone line from the caller by said circuit means during the time of duration of the beep tone transmitted to the caller over the telephone line to cause the fourth circuit to rewind the T-1 tape mechanism to its beginning position; and subsequently to cause the third circuit to move the T-1 tape mechanism in the forward direction to enable a new announcement received from the caller over the telephone line by the input circuit to be recorded on the T-1 tape mechanism; and the microcomputer causing said beep oscillator to record a beep tone on the T-1 tape mechanism at the termination of the new announcement, and for then causing said third circuit to terminate the forward motion of the T-1 tape mechanism.

3. The combination defined in claim 2, and which includes circuitry connecting the T-1 tape mechanism to the microcomputer for introducing the beep tone recorded on the T-1 tape to the microcomputer during a $T_1$ interval to cause the third circuit to stop the forward motion of the T-1 tape, and to cause the first circuit to move the T-2 tape mechanism in the forward direction to enable a message received from a caller over the telephone line by the input circuit to be recorded on the T-2 tape mechanism.

4. The combination defined in claim 1, in which the microcomputer responds to a remote control signal received over the telephone line from a caller by said circuit means to cause the second circuit to rewind the T-2 tape mechanism a predetermined amount, and then to de-activate the second circuit and activate the first circuit to cause the T-2 tape mechanism to move in a forward direction to cause messages recorded on the T-2 tape mechanism to be transmitted to the caller through the output circuit and over the telephone line.

5. The combination defined in claim 4, in which the microcomputer activates the beep oscillator after the messages recorded on the T-2 tape mechanism have been transmitted to the caller over the telephone line, to cause the beep oscillator to transmit a beep tone over the telephone line to the caller, and then de-activating the first circuit to stop the forward motion of the T-2 tape mechanism.

6. The combination defined in claim 5, in which the microcomputer responds to a remote control signal received over the telephone line by said circuit means from the caller during or after said last-named beep tone to activate said second circuit so as to cause the T-2 tape mechanism to drive the T-2 tape in the reverse direction to a predetermined position.

7. The combination defined in claim 6, and which includes an erase head magnetically coupled to the T-2 tape, and circuitry controlled by said microcomputer for activating said erase head as the T-2 tape is being driven in the reverse direction.

8. The combination defined in claim 4, in which the microcomputer responds to a remote control signal received from a caller over the telephone line by the circuit means to activate the beep oscillator to cause a beep tone to be transmitted over the telephone line to the caller in the event there are no messages on the T-2 tape mechanism to be transmitted to the caller.

9. The combination defined in claim 8, in which the microcomputer subsequently activates the fourth circuit to cause the T-1 tape mechanism to rewind to its beginning position.

10. The combination defined in claim 8, in which the microcomputer responds to a remote control signal received over the telephone line by said circuit means from the caller during the last-named beep tone to activate said second circuit so as to cause the T-2 tape mechanism to drive the T-2 tape in the reverse direction for the duration of the remote control signal.

11. The combination defined in claim 10, in which the microcomputer subsequently activates the fourth circuit to cause the T-1 tape mechanism to rewind to its beginning position.

* * * * *